3,538,454
LASER EXCITATION
Robert Siegenthaler, Bern, Switzerland, assignor to Institut fur angewandte Physik der Universitat Bern, Bern, Switzerland
Filed Aug. 29, 1967, Ser. No. 664,199
Claims priority, application Switzerland, Sept. 7, 1966, 12,931/66
Int. Cl. H01s 3/04
U.S. Cl. 331—94.5            1 Claim

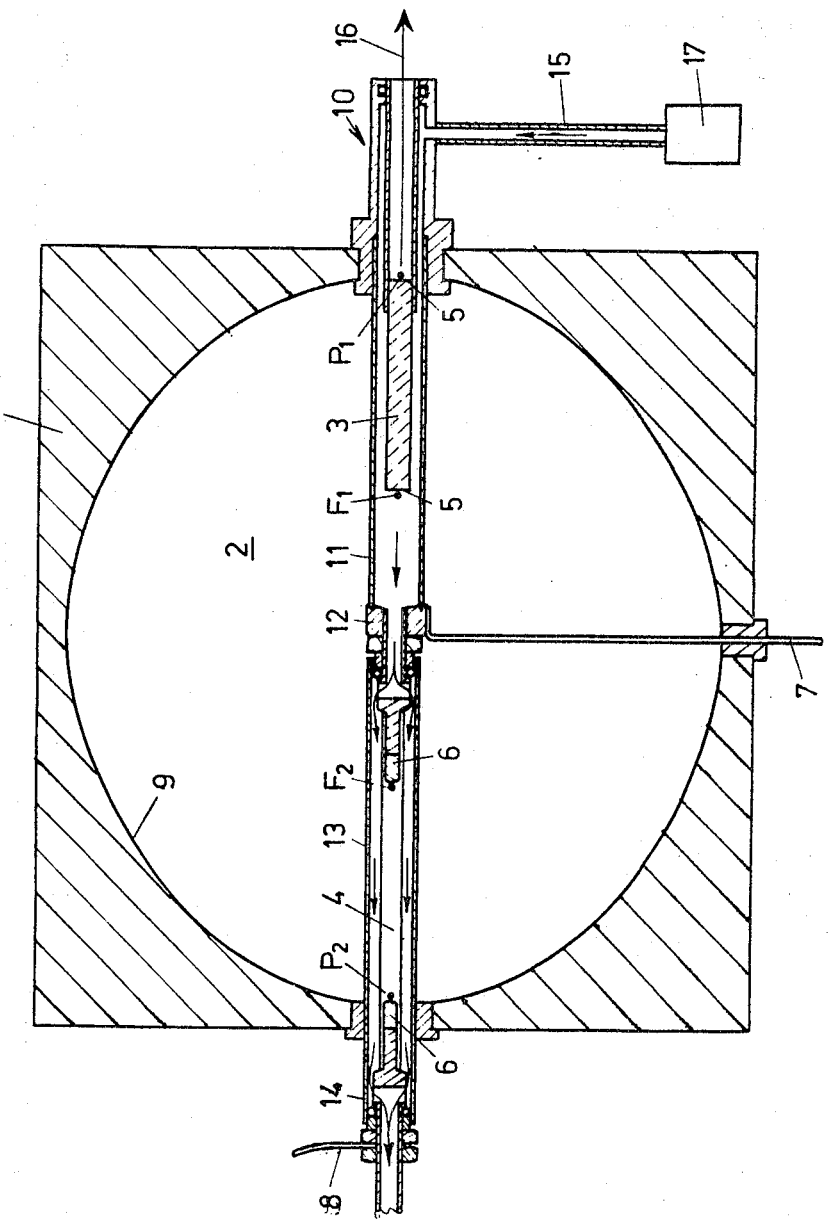

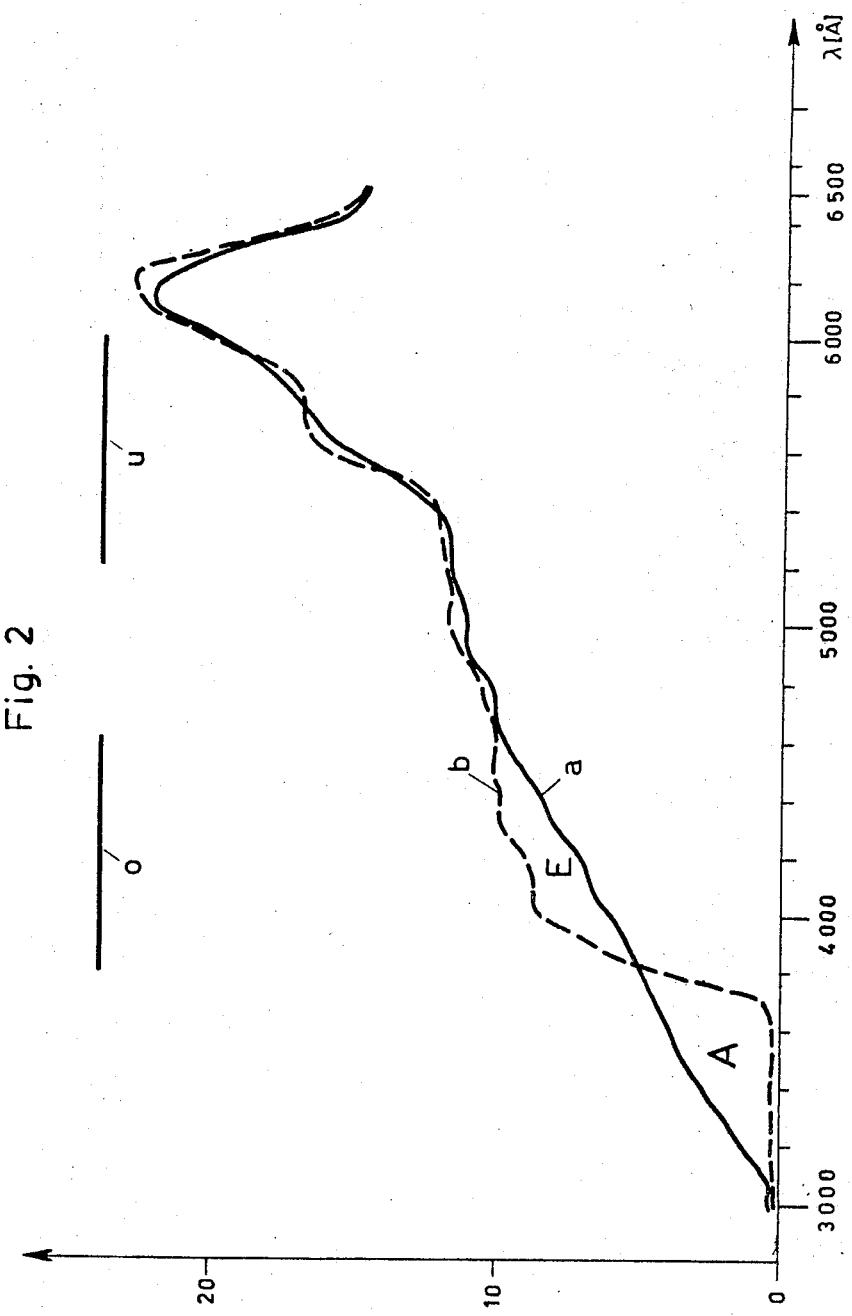

ABSTRACT OF THE DISCLOSURE

Process and apparatus for exciting a laser. The rays furnished by the light source are conducted through a solution that absorbs the shorter wave rays thereof and emits longer wave rays. The apparatus has a transparent conduit for a cooling liquid, and the aforesaid solution is used as the coolant.

---

The invention relates to a process and apparatus for exciting a laser by means of a light source.

It is among the principal objects of the invention to reduce the energy necessary to produce a certain useful radiation.

Broadly speaking the invention provides for leading the light, that is furnished by the light source, to the laser through at least one solution composed of a solvent and at least one scintillator, so that relatively short waved rays absorbed in the solution are again emitted by the same as relatively long waved rays in one or more absorption bands of the laser. The apparatus to carry out this process is characterized therein that the said solution flows as a coolant through transparent conduits that surround the laser and the light source.

Further objects and advantages of the invention will be set forth in part in the following specification and in part will be obvious therefrom without being specifically referred to, the same being realized and attained as pointed out in the claims hereof.

For a fuller understanding of the nature and objects of the invention, reference should be had to the following detailed description, taken in connection with the accompanying drawings, in which:

FIG. 1 is a sectional view showing a laser arrangement in accordance with the invention; and FIG. 2 is a diagram showing two emission spectra.

The laser arrangement of the drawing shows a hollow body 1 that defines a hollow ellipsoid chamber 2. In the chamber 2 there is disposed a ruby laser rod 3 that has metal coated ends, and flashlight tube 4 that forms the light source. The ruby rod 3 extends from the one focal point $F_1$ of the hollow chamber 2 to one end $P_1$ of the rotation axis of the ellipsoid, and the light path of the flashlight tube 4 extends from the other focal point $F_2$ to the other end $P_2$ of this axis. The metal coated faces 5 of the ruby rod 3 are near the locations $F_1$ and $P_1$; while at $F_2$ and $P_2$ the discharge surfaces of the electrodes 6 of the flashlight tube 4 are positioned, to which, by means of two conductors 7 and 8, electric energy is fed in the form of strong condensator discharges.

All the light rays that emanate from the flashlight tube 4 are reflected by the metal coated surface 9 of the chamber 2 onto the rod 3. The hollow body 1 that defines the chamber 2 may, for example, be composed of two aluminum parts which are provided with the polished reflecting surfaces 9.

The rod 3 is supported in a socket 10 that is connected to another socket 12 by means of a light permeable tube 11 which surrounds the rod 3. The socket 12 has a central bore for one end of the flashlight tube 4. The socket 12 is connected to a third socket 14 by means of a light permeable tube 13 which surrounds the flashlight tube 4. The socket 14 also has a central bore, but for the other end of the flashlight tube 4. The socket 10 is provided with a radial inlet 15 for a coolant that flows through the parts 11–14 in the direction of the arrows shown in FIG. 1.

The light rays that have been excited in the laser rod 3 by the light falling thereon and, all in a known manner, reflected between its metal coated end surfaces and thereby amplified, result in the effective light ray pencil 16.

The above described laser arrangement is essentially known; until now its cooling system was operated with water as the coolant.

In order to reduce the threshold of the laser, namely to reduce the level of the electric energy that is led to the laser at which energy level there originates an effective ray pencil 16, however, the invention provides for using as coolant not water but a specific solution. This solution comprises an organic solvent, for instance, dekalin (dekahydronaphthalene) and at least one scintillator, for example "PBBO", wherein PBBO is the usual abbreviation for 2-(4'-biphenylyl)-6-phenylbenzoxazol. The concentration of the solution furnished by a solution source 17 is, for instance, .4 gram per liter, but may be higher, for example 2 grams per liter.

Scintillators are fluorescent organic compounds which have the quality to absorb rays of relatively short wave lengths and to emit the energy at once in the form of rays of relatively longer wave lengths. Until now scintillators have been used in scintillation counters and as optical brighteners. Optical brighteners were for instance, put into paper, textiles and also into detergents; they emit absorbed ultra violet radiation in a range above about 3700 A., so that the respective materials appear whiter.

All parts, of the described arrangement of FIG. 1, with which the said solution is in contact are composed of a material that is resistant to this solution. This resistant material had, of course, not been used in such apparatus heretofore for the water cooled arrangement.

The solution may, if desired, after passing through an outer cooler (not shown) be pumped back into the source 17 (cycle cooling).

In FIG. 2, the graph $a$ shows the emission spectrum of the flashlight tube 4, for instance of an Edgerton flashlight tube, type FX–62, B–3, which is operated at 600 ws. On the abscissa the wave length lambda of the emitted light is shown in A., and on the ordinata the number of the emitted photons is shown on an arbitrary scale. The graph $b$ shows the spectrum of the light emitted by the flashlight tube 4 after passing through the solution that shifted the wave lengths. It is apparent that this "shifting solution" in a region A below about 3700 A. absorbs strongly photons, in a region E above about 3700 A. emits additional photons, while above about 4600 A. both graphs $a$ and $b$ do not differ substantially.

For the emission of a ruby laser it is of course decisive that the ruby has two light absorption bands, whereby the laser produces a stronger usable ray the more light serving for its excitation (usually called "pump light") is absorbed in these bands. FIG. 2 shows the two absorption bands of the ruby, the upper band being designated $o$ and the lower band $u$. As the pump light according to the graph $b$ in the upper absorption band $o$ contains substantially more photons than the original light of the flashlight tube according to the graph $a$, the threshold of the laser arrangement of FIG. 1 according to the described process is reduced and the latter works with a higher degree of efficiency when this threshold is surpassed. With the above named shifting solution, the reduction of the threshold is estimated to about 6 percent. This improvement is reached although of course not all the photons absorbed in the solution are again emitted in a longer wave region, especially not the photons absorbed in the solvent itself; furthermore there occur certain losses at the transparent cooling ducts 11 and 13, for instance by total reflection.

It may be expected that with other light sources and other shifting solutions the reduction of the threshold and correspondingly the improvement of the degree of efficiency may be substantially increased.

As a light source there may be used for instance a xenon-flashlight tube operated by double pulse technique, which has an extremely high emission in the UV-region which latter may be shifted by the shifting solution into the upper ruby absorption band $o$. Furthermore, shifting solutions may be provided that contain scintillators which absorb photons emitted in the region between the bands $o$ and $u$ to emit the same in the lower region $u$. Moreover, several scintillators with different regions of absorption and emission may be dissolved in order to shift in this manner from a very board region of emission of the light source much light into the absorption band or bands of the laser. Scintillators may be used where the region of absorption of one coincides practically with the region of emission of the other, thereby creating a sort of "chain of scintillators" within the same shifting solution; or also different shifting solutions through which the light is led on its path from the light source to the laser. Such a chain of scintillators may be especially advantageous in pumping a neodymium glass laser which at about 5700 A., has a relatively narrow absorption band.

The light source may also be a continuously operating light source, for example an Hg-high pressure lamp, wherein emission lines are used for the pumping of the laser which, due to the shifting solution, lie in the UV region and are especially intensive.

I wish it to be understood that I do not desire to be limited to the exact details of construction shown and described, for obvious modificaions will occur to a person skilled in the art.

Having thus described the invention, what I claim as new and desire to be secured by Letters Patent, is as follows:

1. An apparatus for exciting a laser by means of a light source comprising an elongated light source which strongly emits light in the UV-region, an elongated ruby laser having upper and lower absorption bands, said laser being disposed coaxially with said light source, a hollow body forming a chamber which at least partially surrounds said light source and said laser, said chamber having a light reflecting inner surface, a conduit structure for a liquid surrounding said light source and said laser, means for supplying said liquid in a flow parallel with and surrounding said light source and said laser, said conduit structure being transparent and said liquid including at least one solution comprising a solvent and at least one scintillator, said solution having the properties to absorb the light rays of relatively short wave lengths emitted by said light source and impinging upon said liquid and to emit rays of relatively long wave lengths, said latter rays being reflected by said chamber surface and falling within at least one absorption band of said laser.

References Cited

UNITED STATES PATENTS

| | | |
|---|---|---|
| 2,314,096 | 3/1943 | Leverenz. |
| 2,985,593 | 5/1961 | Broderick et al. \_\_\_\_ 252—301.2 |
| 3,293,564 | 12/1966 | Fan _____ 331—94.5 |
| 3,353,115 | 11/1967 | Maiman _____ 331—94.5 |

OTHER REFERENCES

Ross, Dieter, "Radiofrequency Beats Between Components of Split Axial Modes in Ruby Lasers." Proceedings of the IEEE, vol. 51, No. 11. November 1963, pp. 1668–1669.

RONALD L. WIBERT, Primary Examiner

T. MAJOR, Assistant Examiner

U.S. Cl. X.R.

252—301.2; 260—307